United States Patent [19]
Jaramillo

[11] Patent Number: 5,872,937
[45] Date of Patent: Feb. 16, 1999

[54] SYSTEM FOR OPTIMIZING BUS ARBITRATION LATENCY AND METHOD THEREFOR

[75] Inventor: Kenneth Jaramillo, Phoenix, Ariz.

[73] Assignee: VLSI Technology, Inc., San Jose, Calif.

[21] Appl. No.: 837,429

[22] Filed: Apr. 17, 1997

[51] Int. Cl.[6] .................................................. G06F 13/00
[52] U.S. Cl. ........................ 395/287; 395/298; 395/305
[58] Field of Search ................................... 395/287, 298, 395/305

[56] References Cited

U.S. PATENT DOCUMENTS 5,241,632   8/1993   O'Connell et al. ..................... 395/297

Primary Examiner—Meng-Ai T. An
Assistant Examiner—Sumati Lefkowitz
Attorney, Agent, or Firm—Harry M. Weiss; Jeffrey D. Moy; Harry M. Weiss & Associates, P.C.

[57] ABSTRACT

A system for optimizing arbitration latency of a bus. The system places a bus grant idle state insertion logic block in parallel with a bus grant decision logic block. This allows the bus grant idle state insertion logic block to immediately deassert all bus grant output signals for one clock cycle as long as the bus is idle and a device has requested use of the bus. The bus grant idle state insertion logic block then changes the output of a multiplexer so as to select the bus grant output signal (which becomes valid during this state) and drives the output bus grant signal off chip thereby granting the bus to a device which requested use of the bus. The bus granting process takes two (2) clock cycles.

20 Claims, 1 Drawing Sheet

SYSTEM FOR OPTIMIZING BUS ARBITRATION LATENCY AND METHOD THEREFOR

BACKGROUND OF THE INVENTION

1. Field of the Invention

This invention relates generally to computer systems and, more specifically, to a system for optimizing bus arbitration latency and method therefor.

2. Description of the Prior Art

Every computer system requires the use of arbiters to determine when certain devices in the computer system may access a particular bus. For example, every Peripheral Component Interconnect (PCI) based system requires an arbiter to determine when each PCI device may access the PCI bus. Current PCI based arbiter designs require a plurality of PCI clock cycles to determine when a particular PCI device should next be granted use of the PCI bus. A plurality of PCI clock cycles is generally required in order to meet PCI specifications. For example, one PCI clock cycle is typically needed to clock in bus request signals from the PCI devices into the arbiter. One or more clock cycles are further required in order for the arbiter to determine which PCI device should be granted the bus next. Another clock cycle is then required to drive all PCI device bus grant signals inactive (i.e., required to meet PCI specifications). Finally, one or more clock cycles are required to assert the next bus grant signal.

As can be seen from the above discussion, several PCI bus cycles are required in order for the arbiter to determine which PCI device should next be granted use of the PCI bus. This arbitration timing needs to be optimized in order to reduce the time it takes for a PCI device to be granted access to the PCI bus. By optimizing the arbitration timing, the time it takes for a PCI device to be granted access to the PCI bus may be substantially reduced. This will speed up the flow of data in the computer system, thereby increasing the overall efficiency of the computer system.

Therefore, a need existed to provide a system to optimize bus arbitration latency. The system needs to reduce the time it takes for a device to be granted access to a bus. This will increase the overall efficiency of the computer system by speeding up the flow of data.

SUMMARY OF THE INVENTION

In accordance with one embodiment of the present invention, it is an object of this invention to provide a system to optimize bus arbitration latency.

It is another object of the present invention to provide a system that optimizes bus arbitration latency so as to reduce the amount of time it takes for a device to be granted access to a bus.

It is another object of the present invention to provide a system that optimizes bus arbitration latency so as to increase the efficiency of the computer system by speeding up the flow of data.

It is still another object of the present invention to provide a system to optimize Peripheral Component Interconnect (PCI) bus arbitration latency.

It is still another object of the present invention to provide a system that optimizes PCI bus arbitration latency so as to reduce the amount of time it takes for a PCI device to be granted access to a PCI bus.

BRIEF DESCRIPTION OF THE PREFERRED EMBODIMENTS

In accordance with one embodiment of the present invention, a system for optimizing arbitration latency of a bus is disclosed. The system uses an input latch circuit having an input coupled to the bus request signal lines for latching in bus request signals from devices requiring use of the bus. A bus grant decision logic block is coupled to the input latch circuit. The bus grant decision logic block is used for receiving the bus request signals latched in by the input latch circuit, for prioritizing the bus request signals to determine which of the devices sending the bus request signals should next be granted use of the bus; and for generating a bus grant signal when the bus grant decision logic block has determined which device should next be granted use of the bus. A multiplexer is provided and has a first input coupled to an output of the bus grant decision logic block and a second input coupled to a signal line for deasserting all bus grant signals. A bus grant idle state insertion logic block is also provided and has an input coupled to the bus request signal lines and an output coupled to the multiplexer. The bus grant idle state insertion logic block is used for signalling the multiplexer to output the signal to deassert all bus grant signals when one of the devices sends the bus request signal and the bus is idle and then for signalling the multiplexer to output the bus grant signal when the bus grant decision logic block has determined which device should next be granted use of the bus.

In accordance with another embodiment of the present invention, a method of providing a system for optimizing arbitration latency of a bus comprising the steps of: providing an input latch circuit having an input coupled to the bus request signal lines for latching in bus request signals from devices requiring use of the bus; providing bus grant decision logic coupled to the input latch circuit for receiving the bus request signals latched in by the input latch circuit, for prioritizing the bus request signals to determine which device sending the bus request signal should next be granted use of the bus, and for generating a bus grant signal when the bus grant decision logic has determined which device should next be granted use of the bus; providing a multiplexer having a first input coupled to an output of the bus grant decision logic and having a second input coupled to a signal line for deasserting all bus grant signals; and providing bus grant idle state insertion logic having an input coupled to the bus request signal lines and an output coupled to the multiplexer for signalling the multiplexer to output the signal to deassert all bus grant signals when one of the devices sends a bus request signal and the bus is idle and then for signalling the multiplexer to output the bus grant signal when the bus grant decision logic has determined which device should next be granted use of the bus.

The foregoing and other objects, features, and advantages of the invention will be apparent from the following, more particular, description of the preferred embodiments of the invention, as illustrated in the accompanying drawings.

DETAILED DESCRIPTION OF THE PREFERRED EMBODIMENTS

Figure 1:
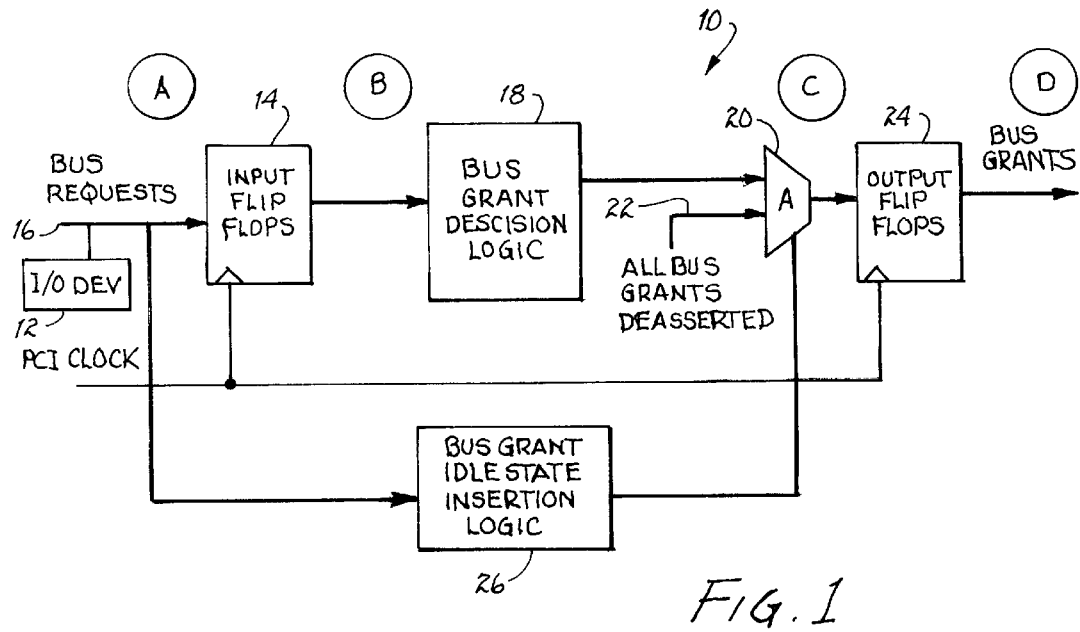
FIG. 1 is a simplified functional block diagram of a system to optimize bus arbitration latency.

Referring to FIG. 1, wherein like numerals and symbols represent like elements, a system for optimizing bus arbitration latency 10 (hereinafter arbiter 10) is shown. In the preferred embodiment of the present invention, the arbiter 10 is a Peripheral Component Interconnect (PCI) arbiter 10 which is used to reduce the time it takes for a PCI device 12 to be granted access to a PCI bus. While the system will be described in relation to PCI devices 12 and a PCI bus, it should be noted that the arbiter 10 may be used with other types of devices and busses.

The arbiter 10 uses a latching mechanism 14 to latch in the current state of the bus request signal line 16. In the preferred embodiment of the present invention, the latching mechanism 14 is required in order to meet PCI specification setup time requirements for point to point signals (i.e., approximately 12 ns). It would be extremely difficult to meet the setup time requirements without the use of the latching mechanism 14 due to the amount of logic in the bus grant decision logic block 18.

The latching mechanism 14 is generally a flip flop 14. Although only one flip flop 14 is shown in FIG. 1, it should be noted that in general, the arbiter 10 will use a plurality of flip flops 14. In the preferred embodiment, each device 12 will have a separate bus request signal line 16 which is coupled to a separate and different flip flop 14. Thus, if there were six (6) devices 12 which required the use of a particular bus, there would be six (6) flip flops 14 to latch in the current state of the six (6) different bus request signal lines 16.

The output of each flip flop 14 is coupled to an input of the bus grant decision logic block 18. The bus grant decision logic block 18 takes the output from each flip flop 14 and prioritizes the bus request signals to determine which of the devices 12 which are sending bus request signals should next be granted use of the bus. The bus grant decision logic block 18 will then generate a bus grant signal after the bus grant decision logic block 18 has determined which device 12 should next be granted use of the bus.

The output of the bus grant decision logic block 18 is coupled to one input of a multiplexer 20. The second input of the multiplexer 20 is coupled to a signal line 22 which will generate a signal to deassert all bus grant signals. An output latching mechanism 24 takes the output of the multiplexer and drives the signals off chip. The output latching mechanism 24 are needed in a PCI based system to meet the PCI specification's data valid timing requirement for point to point signals (i.e., approximately 12 ns). Preferably, the output latching mechanism 24 is a flip flops 24. Although only one output flip flop 24 is shown in FIG. 1, it should be noted that in general, the arbiter 10 will use a plurality of output flip flops 24. In the preferred embodiment of the present invention, the number of output flip flops 24 will equal the number of devices 12 using the arbiter 10.

A bus grant idle state insertion logic block 26 is coupled in parallel with the bus grant decision logic block 18. The bus grant idle state insertion logic block 26 has an input coupled to the bus request signal lines 16 and an output coupled to the multiplexer 20. The bus grant idle state insertion logic block 26 drives all bus grant signals inactive if the bus is idle and the bus is about to be granted to another device 12 (which is different from the device 12 that is now granted use of the bus). This is a requirement for systems, such as a PCI based system, in order to avoid potential bus contention on bus address lines.

The bus grant idle state insertion logic block 26 takes un-registered bus request signals from the bus request signal lines 16 and immediately signals the multiplexer 20 to deassert all bus grant signals. The multiplexer 20 will immediately drive the inputs of the output flip flops 24 to deassert all bus grant outputs for one clock cycle as long as the bus is idle and a device is requesting the use of the bus. Thus, under the present invention, the arbiter 10 will optimize the bus arbitration latency since the bus grant signals are driven inactive the same clock cycle that the bus request signals are latched into the input flip flops 14. This means that the bus may be granted to a device on the next clock cycle.

OPERATION

Figure 2:
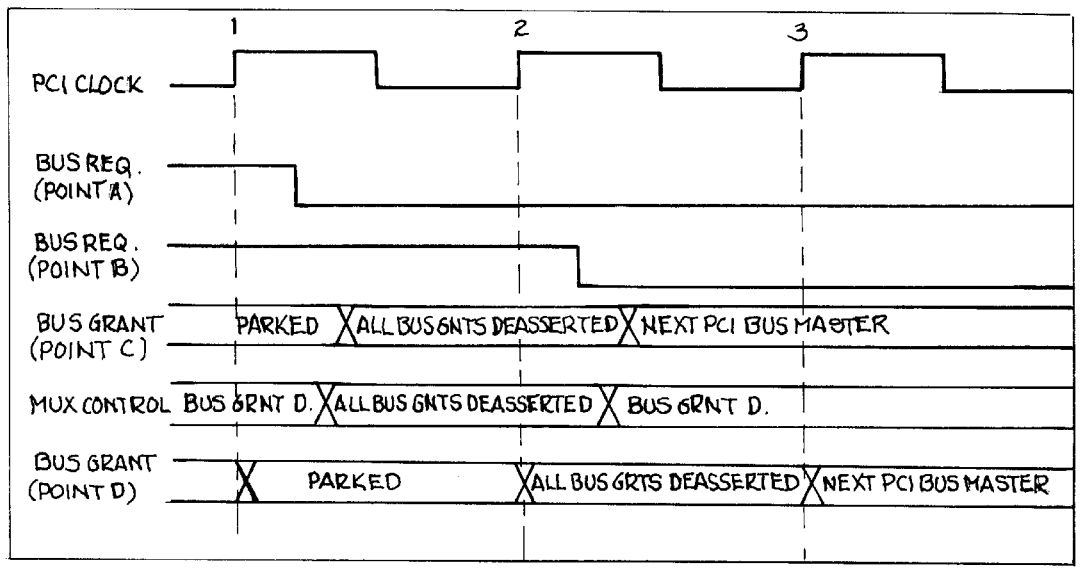
FIG. 2 is a timing diagram for the system to optimize bus arbitration latency depicted in FIG. 1.

Referring now to FIGS. 1 and 2, the operation of the arbiter 10 will be described with reference to PCI specifications. However, it should be noted that the arbiter 10 may be used with other types of systems. The assumed state of the arbiter 10 prior to clock cycle one is that the arbiter 10 is parking the PCI bus on a PCI master (i.e., this is required by PCI specifications). A PCI device 12 asserts a bus request signal via bus request signal lines 16 during the first clock cycle as shown in FIG. 2. During this clock period, the bus grant idle state insertion logic block 26 detects that a PCI device 12 requires use of the PCI bus and changes the output of the multiplexer 20 so as to deassert all bus grants. During the second clock cycle, the bus request signal is latched into the input latching mechanism 14. Also during this clock cycle, the output latching mechanism 24 drives all bus grants deasserted and the bus grant idle state insertion logic block 26 now changes the output of the multiplexer 20 so as to select the bus grant decision logic block's 18 bus grant output signal (which becomes valid during this state). During the third clock cycle, the output latching mechanism 24 drives the output bus grant signal from the multiplexer 20 off chip thereby granting the bus to the device 12 which requested use of the bus.

While the invention has been particularly shown and described with reference to preferred embodiments thereof, it will be understood by those skilled in the art that the foregoing and other changes in form, and details may be made therein without departing from the spirit and scope of the invention.

I claim:

1. A system for optimizing arbitration latency of a bus comprising, in combination:

an input latch circuit having an input coupled to bus request signal lines for latching in bus request signals from devices requiring use of said bus;

bus grant decision logic coupled to said input latch circuit for receiving said bus request signals latched in by said input latch circuit, for prioritizing said bus request signals to determine which of said devices sending said bus request signals should next be granted use of said bus; and for generating a bus grant signal when said bus grant decision logic has determined which device should next be granted use of said bus;

a multiplexer having a first input coupled to an output of said bus grant decision logic and having a second input coupled to a signal line for deasserting all bus grant signals; and bus grant idle state insertion logic having an input coupled to said bus request signal lines and an output coupled to said multiplexer for signalling said multiplexer to output said signal to deassert all bus grant signals when one of said devices sends said bus request signal and said bus is idle and then for signalling said multiplexer to output said bus grant signal when said bus grant decision logic has determined which device should next be granted use of said bus.

2. A system for optimizing arbitration latency of a bus in accordance with claim 1 further comprising an output latch circuit having an input coupled to an output of said multiplexer for latching in and outputting said signal to deassert all bus grant signals outputted by said multiplexer and for latching in and outputting said bus grant signal outputted by said multiplexer.

3. A system for optimizing arbitration latency of a bus in accordance with claim 1 further comprising a clock signal coupled to said input latch circuit for controlling timing of said input latch circuit to latching in and output said bus request signals.

4. A system for optimizing arbitration latency of a bus in accordance with claim 2 further comprising a clock signal coupled to said output latch circuit for controlling timing of said output latch circuit to latching in and output signals received from said multiplexer.

5. A system for optimizing arbitration latency of a bus in accordance with claim 2 wherein said input latch circuit comprises at least one flip flop having an input coupled to a single device requiring use of said bus.

6. A system for optimizing arbitration latency of a bus in accordance with claim 2 wherein said input latch circuit comprises a plurality of flip flops equal to a number of said devices which use said bus wherein each of said plurality of flip flops have an input coupled to a separate and different device requiring use of said bus and an output coupled to said bus grant decision logic.

7. A system for optimizing arbitration latency of a bus in accordance with claim 5 wherein said output latch circuit comprises at least one flip flop having an input coupled to said multiplexer.

8. A system for optimizing arbitration latency of a bus in accordance with claim 6 wherein said output latch circuit comprises a plurality of flip flops equal to a number of said devices which use said bus wherein each of said plurality of flip flops have an input coupled to said multiplexer.

9. A system for optimizing arbitration latency of a bus in accordance with claim 1 wherein said bus is a Peripheral Component Interconnect (PCI) bus.

10. A system for optimizing arbitration latency of a bus in accordance with claim 9 wherein each of said devices are a Peripheral Component Interconnect (PCI) device.

11. A system for optimizing arbitration latency of a Peripheral Component Interconnect (PCI) bus comprising, in combination:

an input latch circuit having an input coupled to bus request signal lines for latching in bus request signals from PCI devices requiring use of said PCI bus;

bus grant decision logic coupled to said input latch circuit for receiving said bus request signals latched in by said input latch circuit, for prioritizing said bus request signals to determine which of said devices sending said bus request signals should next be granted use of said bus; and for generating a bus grant signal when said bus grant decision logic has determined which device should next be granted use of said bus;

a multiplexer having a first input coupled to an output of said bus grant decision logic and having a second input coupled to a signal line for deasserting all bus grant signals;

bus grant idle state insertion logic having an input coupled to said bus request signal lines and an output coupled to said multiplexer for signalling said multiplexer to output said signal to deassert all bus grant signals when one of said devices sends said bus request signal and said bus is idle and then for signalling said multiplexer to output said bus grant signal when said bus grant decision logic has determined which device should next be granted use of said bus;

an output latch circuit having an input coupled to an output of said multiplexer for latching in and outputting said signal to deassert all bus grant signals outputted by said multiplexer and for latching in and outputting said bus grant signal outputted by said multiplexer; and a clock signal coupled to said input latch circuit for controlling timing of said input latch circuit to latching in and output said bus request signals and coupled to said output latch circuit for controlling timing of said output latch circuit to latching in and output signals received from said multiplexer.

12. A method of providing a system for optimizing arbitration latency of a bus comprising the steps of:

providing input latch circuit having an input coupled to bus request signal lines for latching in bus request signals from devices requiring use of said bus;

providing bus grant decision logic coupled to said input latch circuit for receiving said bus request signals latched in by said input latch circuit, for prioritizing said bus request signals to determine which of said devices sending said bus request signals should next be granted use of said bus; and for generating a bus grant signal when said bus grant decision logic has determined which device should next be granted use of said bus;

providing multiplexer having a first input coupled to an output of said bus grant decision logic and having a second input coupled to a signal line for deasserting all bus grant signals; and providing bus grant idle state insertion logic having an input coupled to said bus request signal lines and an output coupled to said multiplexer for signalling said multiplexer to output said signal to deassert all bus grant signals when one of said devices sends said bus request signal and said bus is idle and then for signalling said multiplexer to output said bus grant signal when said bus grant decision logic has determined which devices should next be granted use of said bus.

13. The method of claim 12 further comprising the step of providing an output latch circuit having an input coupled to an output of said multiplexer for latching in and outputting said signal to deassert all bus grant signals outputted by said multiplexer and for latching in and outputting said bus grant signal outputted by said multiplexer.

14. The method of claim 13 further comprising the step of providing a clock signal coupled to said input latch circuit for controlling timing of said input latch circuit to latching in and output said bus request signals and coupled to said output latch circuit for controlling timing of said output latch circuit to latching in and output signals received from said multiplexer.

15. The method of claim 13 wherein said step of providing an input latch circuit further comprises the step of providing at least one flip flop having an input coupled to a single device requiring use of said bus.

16. The method of claim 13 wherein said step of providing an input latch circuit further comprises the step of providing a plurality of flip flops equal to a number of said devices which use said bus wherein each of said plurality of flip flops have an input coupled to a separate and different device requiring use of said bus and an output coupled to said bus grant decision logic.

17. The method of claim 15 wherein said step of providing said output latch circuit further comprises the step of providing at least one flip flop having an input coupled to said multiplexer.

18. The method of claim 16 wherein said step of providing said output latch circuit further comprises the step of providing a plurality of flip flops equal to a number of said devices which use said bus wherein each of said plurality of flip flops have an input coupled to said multiplexer.

19. The method of claim 12 wherein said bus is a Peripheral Component Interconnect (PCI) bus.

20. The method of claim 19 wherein each of said devices are a Peripheral Component Interconnect (PCI) device.

* * * * *